L. W. COPPOCK.
AUTOMOBILE CONSTRUCTION.
APPLICATION FILED AUG. 20, 1913.
1,111,525.
Patented Sept. 22, 1914.
2 SHEETS—SHEET 1.
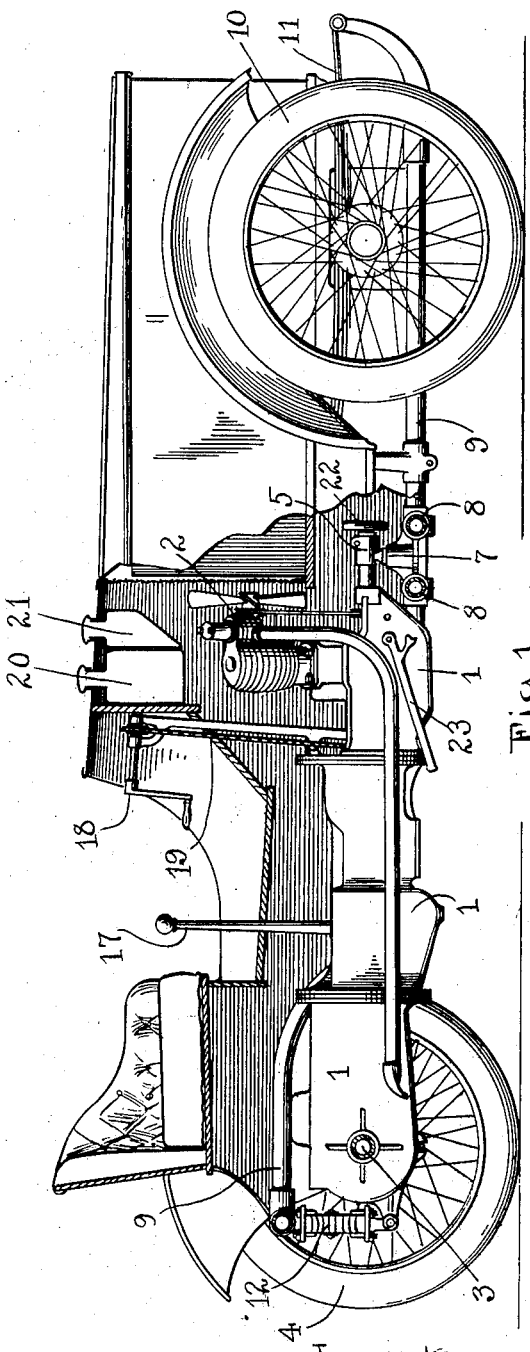
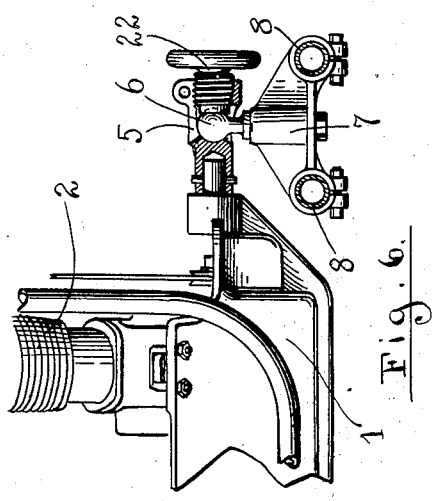
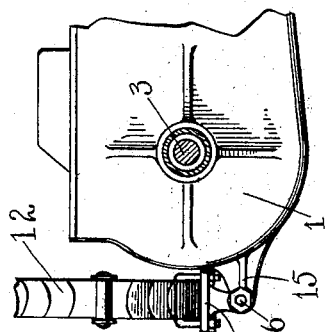
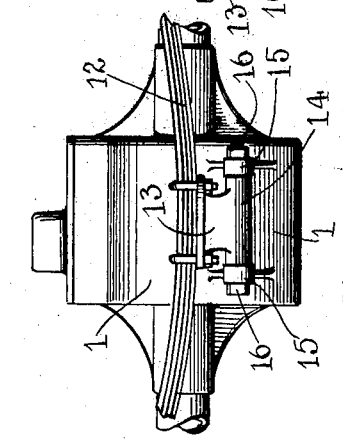
Witnesses
Harold O. Van Antwerp
Mae Parker
Inventor
Lembert W. Coppock.
By Luther V. Moulton
Attorney

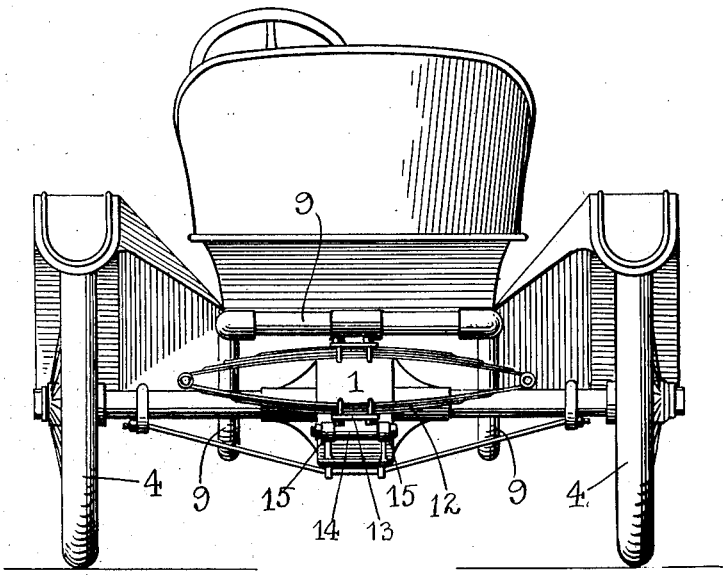
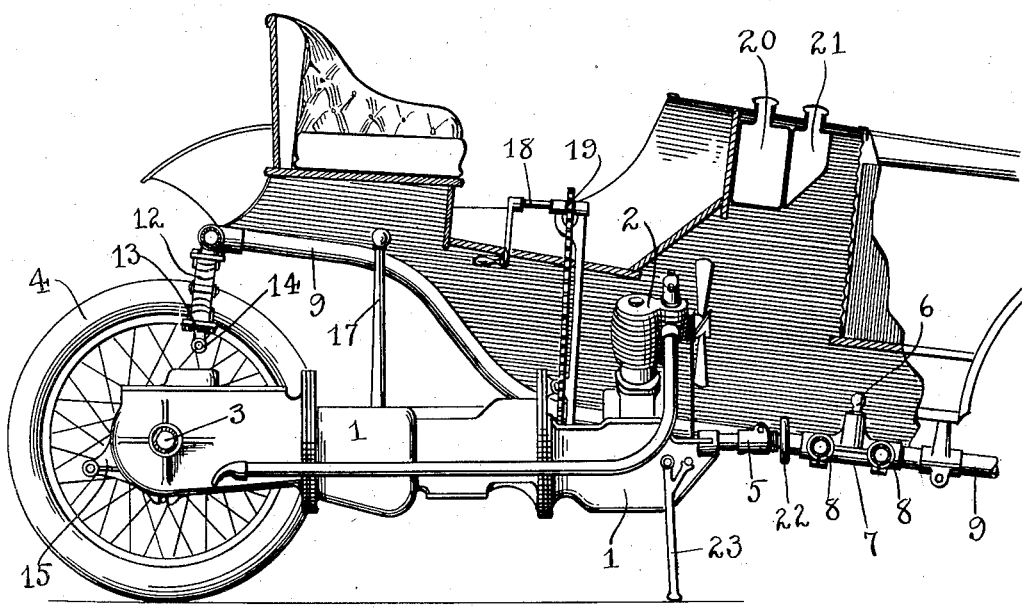

UNITED STATES PATENT OFFICE.

LEMBERT W. COPPOCK, OF GRAND RAPIDS, MICHIGAN.

AUTOMOBILE CONSTRUCTION.

1,111,525. Specification of Letters Patent. Patented Sept. 22, 1914.

Application filed August 20, 1913. Serial No. 785,784.

*To all whom it may concern:*

Be it known that I, LEMBERT W. COPPOCK, a citizen of the United States of America, residing at Grand Rapids, in the county of Kent and State of Michigan, have invented certain new and useful Improvements in Automobile Construction; and I do hereby declare the following to be a full, clear, and exact description of the invention, such as will enable others skilled in the art to which it appertains to make and use the same.

My invention relates to improvements in automobile construction, and its principal object is to so mount the motor and power transmitting mechanism that it may be readily disconnected from the frame and body of the automobile and to so connect it to the frame that its thrust will be applied well forward and directly through the casing which contains such driving mechanism.

The invention also embodies various ancillary features as hereinafter more fully described and particularly pointed out in the claims.

This invention consists essentially in mounting the motor, the power transmitting mechanism and the rear axle driven thereby, all in a common base or casing and this driving unit is then connected as a whole by two simple fastenings to the main frame of the automobile which carries the body, the forward wheels, steering gear, etc.

A preferred construction and arrangement of this device will more fully appear by reference to the accompanying drawings, in which:—

Figure 1 is a side view of an automobile embodying my invention shown partially in elevation and partially in section; Fig. 2 is a rear view of the same; Fig. 3 shows a sectional elevation of the rear part of the automobile showing the frame disconnected from the driving unit and raised therefrom; Fig. 4 is a rear view of the central part of the axle housing showing the means by which the spring which carries the frame is attached thereto; Fig. 5 is an elevation of the same shown at right angles to Fig. 4; and Fig. 6 is an enlarged elevation partially in section showing the forward end of the driving unit and the means by which it is connected to the frame.

Like numbers refer to like parts in all of the figures.

1 represents the housing of the driving mechanism in which is mounted a motor 2, preferably located at its forward end, the rear axle 3 passing through the rear end of the housing and journaled therein, and in which housing is also any convenient form of power transmitting mechanism intermediate the motor and axle and connecting the same. The exact construction of motor axle and transmission gearing forms no part of this invention and any convenient style of each may be used with equal efficiency. The rear wheels 4 are attached to the outer ends of the axle 3 as usual and support the rear end of the housing of the driving unit while the forward end of the same is provided with an adjustable socket 5 adapted to receive a ball 6, which is mounted on a bracket 7 carried by the cross members 8 connecting the side members 9 of the main frame of the automobile. When in assembled position the ball 6 is in the socket 5 and supports the forward end of the housing of the driving unit, the ball and socket joint thus formed permitting a universal movement at the said connection, thus forming a three point suspension for the housing. The forward ends of the side members 9 of the frame are supported in the usual way by the forward axle, and the front wheels 10 being connected to the axle by means of the springs 11.

The rear end of the frame is supported on a spring 12. preferably of the full elliptic type, and this spring is mounted on the saddle 13, which latter is provided with a boss 14 adapted to fit between lugs 15 which project from the rear end of the housing 1 of the driving unit, and a bolt 16 extends through the boss 14 and the lugs 15 to detachably connect the same.

The necessary controlling gear, such as the lever 17 and the starting crank 18, which in this particular device is connected by a chain 19 and sprocket wheels to the engine shaft, and any necessary foot pedals, etc., extend through openings in the floor of the body, so that they may be conveniently operated from the seat thereof. The gasolene oil tanks 20 and 21 are preferably mounted in the body and may be connected by means of flexible tubing (not shown) to the motor. It is possible, however, to locate these tanks also on the housing 1 if so desired.

It will be noted that when the automobile is assembled as shown in Fig. 1 that the rear end of the frame 9 is supported by the spring 12 on the housing 1 and the forward end of the housing is supported by the ball and socket connection 5 and 6 to the cross members 8 on the frame 9, these being the only connections betwen the main frame and the driving unit. When the motive power is exerted through the rear wheels 4, the thrust of the same will be transmitted through the housing 1 to the ball and socket connection 5 and 6, which is located well toward the forward part of the machine and the thrust is exerted practically in a straight line with the axles. By using this construction the ordinary radius rods are eliminated and the construction throughout materially simplified. The stresses due to uneven loading of the body and unevenness of the road traversed are also readily accommodated by virtue of the peculiar suspension of both the frame and propelling mechanism.

Another advantage of this construction is the ease with which the driving mechanism may be removed from the frame of the machine for purposes of repair, etc. It is merely necessary to disconnect such minor connections as gasolene and oil piping, etc., and to then loosen the screw 22 which clamps the ball 6 into the socket 5, and to remove the bolt 16, detaching the saddle 13 from the rear end of the main housing 1, whereupon the rear end of the frame may be raised bodily and the socket 5 lifted from the ball 6, and the whole frame and body moved forward on its front wheels. For convenience a hinged leg 23 is attached to the forward end of the housing 1 and may be let down to support the said forward end when the driving unit is removed from the frame.

What I claim is:—

1. A motor vehicle comprising a frame supported at its forward end on wheels, propelling mechanism comprising a motor, transmission, and a rear axle, a single housing for the propelling mechanism, means for removably supporting the forward end of the housing on said frame, a spring on the rear part of said frame, a saddle attached to said spring including a hollow boss, spaced lugs on the rear of said housing to receive said boss, and a bolt passed through said ears and said boss and thereby supporting said frame on said housing.

2. A motor vehicle comprising a frame supported at its forward end on wheels, propelling mechanism comprising a motor, transmission and a rear axle, a single housing for the motor and the transmission and in which the rear axle is journaled, supporting connections between the rear of the frame and the rear of the housing, a pair of cross-members near the forward part of said frame, a bracket bridging said cross-members and supported thereby, a ball carried by said bracket, and a socket carried by the forward end of the housing to receive said ball and thereby providing a universal movement at said ball and socket joint connection.

3. A motor vehicle, comprising a frame supported at its forward end on wheels, propelling mechanism comprising a motor, transmission, and a rear axle mounted in a single housing, a spring on the rear part of said frame, a saddle attached to said spring, lugs on the rear of said housing to which the said saddle is detachably connected, a cross member near the forward part of said frame, and a ball and socket connecting the cross member and housing.

In testimony whereof I affix my signature in presence of two witnesses.

LEMBERT W. COPPOCK.

Witnesses:
HAROLD O. VAN ANTWERP,
MAE RANKIN.